US006205479B1

(12) United States Patent
Dulai et al.

(10) Patent No.: US 6,205,479 B1
(45) Date of Patent: *Mar. 20, 2001

(54) TWO-TIER AUTHENTICATION SYSTEM WHERE CLIENTS FIRST AUTHENTICATE WITH INDEPENDENT SERVICE PROVIDERS AND THEN AUTOMATICALLY EXCHANGE MESSAGES WITH A CLIENT CONTROLLER TO GAIN NETWORK ACCESS

(75) Inventors: Dharmender S. Dulai, New York, NY (US); Vinod R. Marur, Ridgefield, CT (US); Benjamin F. Vitale; Bruce A. Zenel, both of New York, NY (US)

(73) Assignee: Juno Online Services, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,468

(22) Filed: Apr. 14, 1998

(51) Int. Cl.[7] .......................... G06F 15/173; G06F 15/16
(52) U.S. Cl. ......................... 709/225; 709/229; 709/203; 709/217
(58) Field of Search .................... 709/203, 217–219, 709/223–225, 229; 707/10, 104; 713/200–202; 379/901, 903, 93.02

(56) References Cited

U.S. PATENT DOCUMENTS

| | | | |
|---|---|---|---|
| 5,481,720 | * | 1/1996 | Loucks et al. .................. 713/201 |
| 5,586,260 | * | 12/1996 | Hu .................................. 713/201 |
| 5,708,780 | * | 1/1998 | Levergood et al. ............. 709/229 |
| 5,721,780 | * | 2/1998 | Ensor et al. ..................... 380/25 |
| 5,796,393 | * | 8/1998 | MacNaughton et al. ......... 345/329 |
| 5,845,260 | * | 12/1998 | Nakano et al. ................... 705/26 |
| 5,852,722 | * | 12/1998 | Hamilton ......................... 709/221 |
| 5,889,958 | * | 3/1999 | Willens ............................ 709/229 |
| 5,901,284 | * | 5/1999 | Hamdy-Swink ................. 713/201 |

(List continued on next page.)

OTHER PUBLICATIONS

"Alexa Frequently Asked Questions (FAQs)," Alexa Internet

Primary Examiner—Zarni Maung
Assistant Examiner—Andrew Caldwell
(74) Attorney, Agent, or Firm—Kenyon & Kenyon

(57) ABSTRACT

A method and apparatus to control a client in a communication network accessed by the client through a service provider independent of a client controller. In one embodiment, a hardware capable Internet Service Provider (ISP) functions as the communications network service provider. A virtual ISP operates the client controller, leases Internet access time from the hardware capable ISP, and resells Internet services to users. A client accesses the network through a two stage authentication process. First, the hardware capable ISP authenticates the client using a user-provided ID and password. After successfully logging on to the hardware capable ISP, the client automatically sends a start session message containing user identity information to the client controller. In response, the client controller sends a control message to the client authorizing use of the network for a predetermined time period. When the client stops accessing the network, the client informs the client controller using an end session message. If the client wants to access the network beyond the predetermined time period, the client informs the client controller using a continue session message. If no end session or continue session message is received, the client controller assumes that the client is no longer accessing the network at the end of the predetermined time. The client controller can initiate communication with the client by sending other control messages, such as display and download commands.

55 Claims, 5 Drawing Sheets

U.S. PATENT DOCUMENTS

| | | | |
|---|---|---|---|
| 6,011,910 | * | 1/2000 | Chau et al. ............................. 709/229 |
| 6,012,088 | * | 1/2000 | Li et al. ................................ 709/219 |
| 6,061,650 | * | 5/2000 | Malkin et al. ........................ 704/228 |
| 6,070,243 | * | 5/2000 | See et al. ............................. 713/201 |
| 6,097,719 | * | 8/2000 | Benash et al. ........................ 370/352 |
| 6,108,790 | * | 8/2000 | Moriya et al. ........................ 713/202 |
| 6,112,305 | * | 8/2000 | Dancs et al. .......................... 713/156 |
| 6,119,160 | * | 9/2000 | Zhang et al. .......................... 709/224 |

* cited by examiner

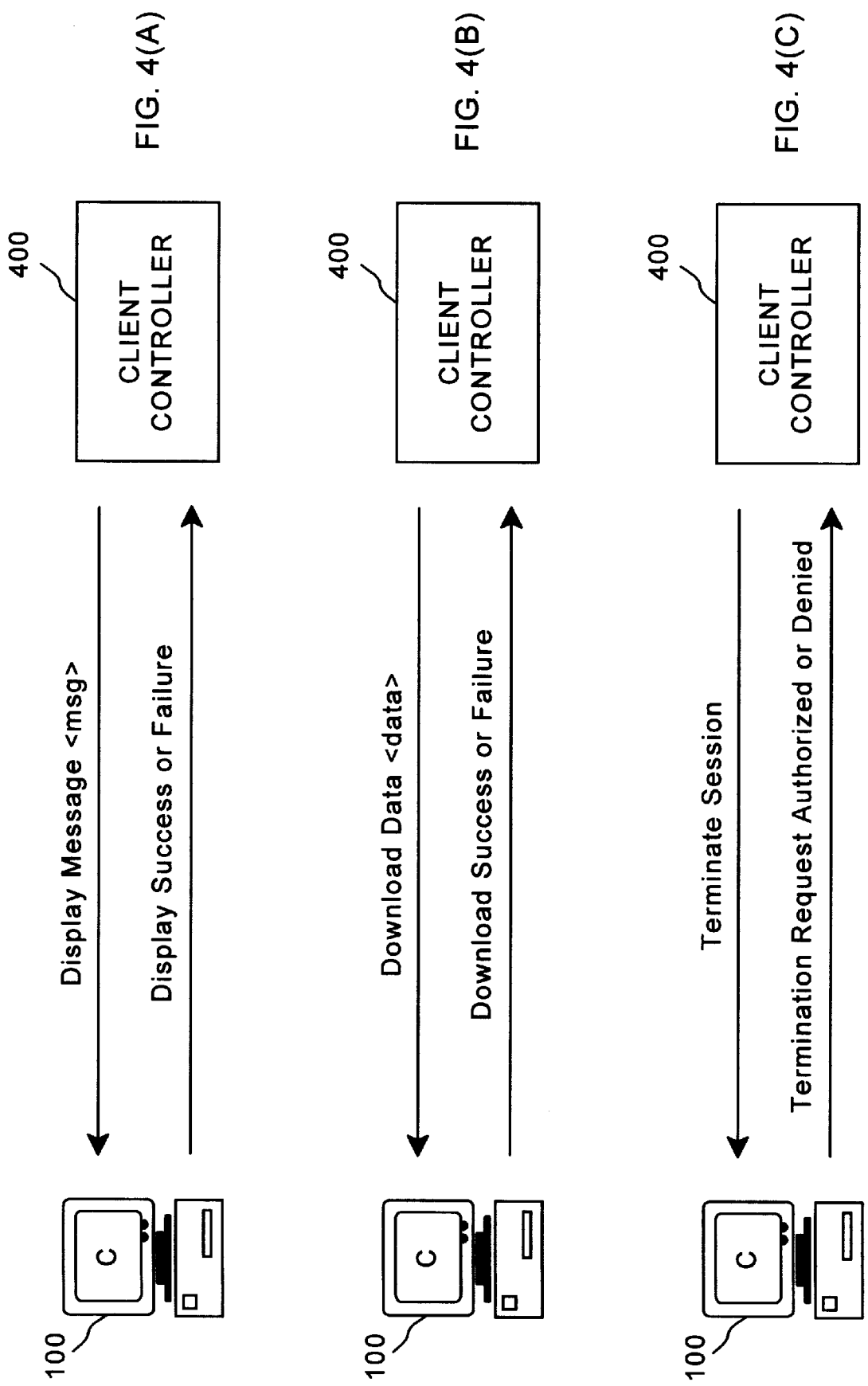

TWO-TIER AUTHENTICATION SYSTEM WHERE CLIENTS FIRST AUTHENTICATE WITH INDEPENDENT SERVICE PROVIDERS AND THEN AUTOMATICALLY EXCHANGE MESSAGES WITH A CLIENT CONTROLLER TO GAIN NETWORK ACCESS

FIELD OF THE INVENTION

The invention relates to communications networks. More particularly, the invention relates to a method and apparatus to control a client in a communications network.

BACKGROUND OF THE INVENTION

A packet-based communications network can transmit a data stream of bits in the form of packets of fixed or variable length for the purpose of moving information between computers. Each packet is routed through the network based on address information contained in the data stream. There are approximately 30 million users of packet networks in the U.S. The Internet, the largest and most well-known of the existing packet networks, connects millions of computers in countries across the world. In addition to the Internet, many companies use packet networks, locally or internally within the company, which are functionally modeled on the Internet. These packet networks, denoted "intranets" or "extranets," are compatible with the Internet Protocol (IP), a communications protocol for the address information of data packets transmitted using the Internet.

The World Wide Web, or "Web," represents a portion of the information on the Internet accessible through a graphical user interface software program, commonly known as a Web "browser." The Netscape Navigator™ browser, available from Netscape Communications Corporation in Mountain View, Calif., is one example of a Web browser. The Web is made up of "pages" that are stored and transmitted over the Internet using the Hyper Text Markup Language (HTML) by computer, known as "servers." In general, a Web page can include combinations of text, graphics, sound, video and small application programs. A Web page can also include a "link" which, when selected by a user, results in the automatic display of another Web page.

Typically, a user will access the Web by establishing a communications link with, or "logging onto," an Internet Service Provider (ISP), perhaps over a telephone line using a modem. When the user requests a Web page, the user's browser communicates with the Internet through the ISP to retrieve the information related to the requested page. The ISP, which can serve thousands of users, generates revenue by charging each user a fee, such as a flat monthly fee, for the service. The ISP can also charge the user a time based fee in addition to, or instead of, the flat fee. Some ISPs also limit the amount of time that a given user can spend accessing the Internet.

The equipment required to operate an ISP can be very expensive, especially if the ISP expects to serve many users. The ISP may have to install, for example, a large number of phone lines, packet routers and communication switches. Moreover, the maintenance and technical support required to keep this equipment running can be difficult and expensive.

A company with the marketing ability required to attract a large number of users may not have the resources and expertise needed to provide Internet access. The company may, for example, be well known by users in a different, but related, field. Such company may also have, or not have, the resources and expertise needed to handle the billing and accounting functions typically provided by an ISP. Conversely, a company with Internet access equipment may not be interested in, or be capable of, the marketing required to attract a large number of users. The company may also lack a support staff to answer user questions and an accounting system to track and bill users.

To solve this problem, it is known that a branded Internet access re-seller can be established to handle the marketing and accounting aspects of Internet access. Such a "virtual" ISP can lease Internet access time from a traditional "hardware capable" ISP, such as for a flat or time based fee. FIG. 1 is a block diagram of a known system of providing access to the Internet 300 through a virtual ISP 200. The virtual ISP 200 serves a number of users 110, 120, 130 by leasing access from a number of ISPs 210, 220 that route communications to and from the Internet 300.

A user subscribes directly with the virtual ISP 200 for Internet access. The virtual ISP 200 assigns a user identifier (ID) and password to the user, and provides this information to one of the ISPs, such as the first ISP 210. The user is typically unaware of the identity of the ISP 210 that actually provides access to the Internet. The virtual ISP 200 also provides the user with a client software program 114 to be used when accessing the Internet 300. As used herein, a "client" is a requesting computer program, and a "server" is a computer program that provides service to the client in response to the request.

To access the Internet 300, the user runs the client program 114 on a PC 110. The client program 114 may include, for example, a communications software program and may be configured to display the name and logo of the virtual ISP 200. The client program 114 is configured to directly contact the ISP 210, using, for example, a modem 116. The client program 114 then presents the user's ID and password to the ISP 210 in order to "log onto" the system. Once the user logs onto the ISP 210, the user can access the Internet 300 with a browser program 112. When the user is finished, he can "log off" the system to end the Internet access "session."

The virtual ISP 200 generally receives a periodic report from each ISP 210, 220 for billing purposes. For example, the ISP 210 may provide the virtual ISP 200 with a usage report each night listing the user ID of every user that accessed the Internet 300 during the last 24 hour period. The report can also reflect the start time and end time, or length, of each such user session in order to determine how much the ISP 210 will bill the virtual ISP 200 for access. The report can also be used by the virtual ISP 200 to in turn bill each user directly.

One problem with known virtual ISP systems, however, is that the virtual ISP 200 does not know which users are currently logged on. That is, although a nightly report may be accurate for billing purposes, it does not reflect in real time which users are communicating with the Internet 300. A known protocol, called the Remote Authentication Dial In User Service (RADIUS) authentication protocol, can alert the virtual ISP 200 when a user logs on, but there is no way to inform the virtual ISP 200 when the user logs off. A related protocol called, the RADIUS accounting protocol, can alert the virtual ISP 200 both when the user logs on and when the user logs off the system. However, the RADIUS accounting protocol operates between a virtual ISP 200 and a physical ISP 210, not between a virtual ISP 200 and a client program 114. Therefore, even the RADIUS accounting protocol does not let the virtual ISP 200 exercise any control over the client program 114.

There are several reasons why a virtual ISP 200 may want to know which users are currently logged onto the system. For example, the virtual ISP 200 may want to communicate with all users who are currently on-line, such as to announce a special event. The virtual ISP 200 would not want to deal with a large number of ISPs to determine which users are currently logged onto each ISP. The virtual ISP 200 may also be interested in which users are currently logged on for trouble shooting purposes.

Moreover, user fraud could be detected, and deterred, if the virtual ISP 200 could maintain an independent log of user access, instead of relying on the report generated by the ISP 210. For example, a user that bypasses the client program 114 and contacts the ISP 210 directly would be detected by comparing the virtual ISP's log with the ISP's report. Similarly, such a log could be used to detect and resolve billing errors between the virtual ISP 200 and the ISP 210.

Another problem with known virtual ISP systems is that the virtual ISP 200 cannot directly control the client program 114 when a user is on-line. Suppose, for example, that the virtual ISP 200 wants to automatically install a new software release, or to update a list of access telephone numbers stored on the user's computer 110. Because the user PC 110 communicates with the ISP 210, and not with the virtual ISP 200, the virtual ISP 200 cannot instruct the client to download the new information. Even if the virtual ISP 200 could arrange to have every individual ISP perform such a download, this approach is cumbersome if the virtual ISP 200 leases access time from a large number of ISPs.

Similarly, the virtual ISP 200 may want to send a message to a user, such as a dialog window explaining why access to the network is being denied. Such an ability would reduce the number of customer support phone calls from users wondering if there is a technical problem with their connection. Because ISP 210 does not know the status of each user's account, and due to limitations in the RADIUS authentication protocol, the ISP 210 cannot perform this action. The virtual ISP 200 may also want to send a message warning a user that their monthly allotment of time is almost over, which is also not known by each ISP.

Another disadvantage of known virtual ISP arrangements is that real-time services cannot be offered to users. For example, the virtual ISP may want to offer users "chat rooms" that let users communicate with each other on a real-time basis. As part of this service, the virtual ISP might like to send a message to a user, letting the user know that certain other users are also currently logged on. Such a feature can typically be blocked by a user, if desired, for privacy reasons. Because the ISP 210 does not know if users are logged onto other ISPs, it cannot perform this service. Similarly, the virtual ISP does not know which users are currently logged on and cannot perform this service.

In view of the foregoing, it can be appreciated that a substantial need exists for a method and apparatus that provides a virtual ISP with real time information about, and control over, a client and solves the other problems, such as those associated with offering real-time services to a user, discussed above.

SUMMARY OF THE INVENTION

The disadvantages of the art are alleviated to a great extent by a method and apparatus to control a client via a client controller in a communications network, accessed by the client though a service provider independent of the client controller. In one embodiment of the present invention, the client controller receives from the client a start session message containing user identity information. The start session message is received using the communications network in accordance with a client control protocol. Based on the user identity information, the client controller can send to the client a control message using the communications network in accordance with the client control protocol.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIGS. 4A to 4C are block diagrams of various server-initiated message exchanges according to embodiments of the present invention.

DETAILED DESCRIPTION

Figure 1:
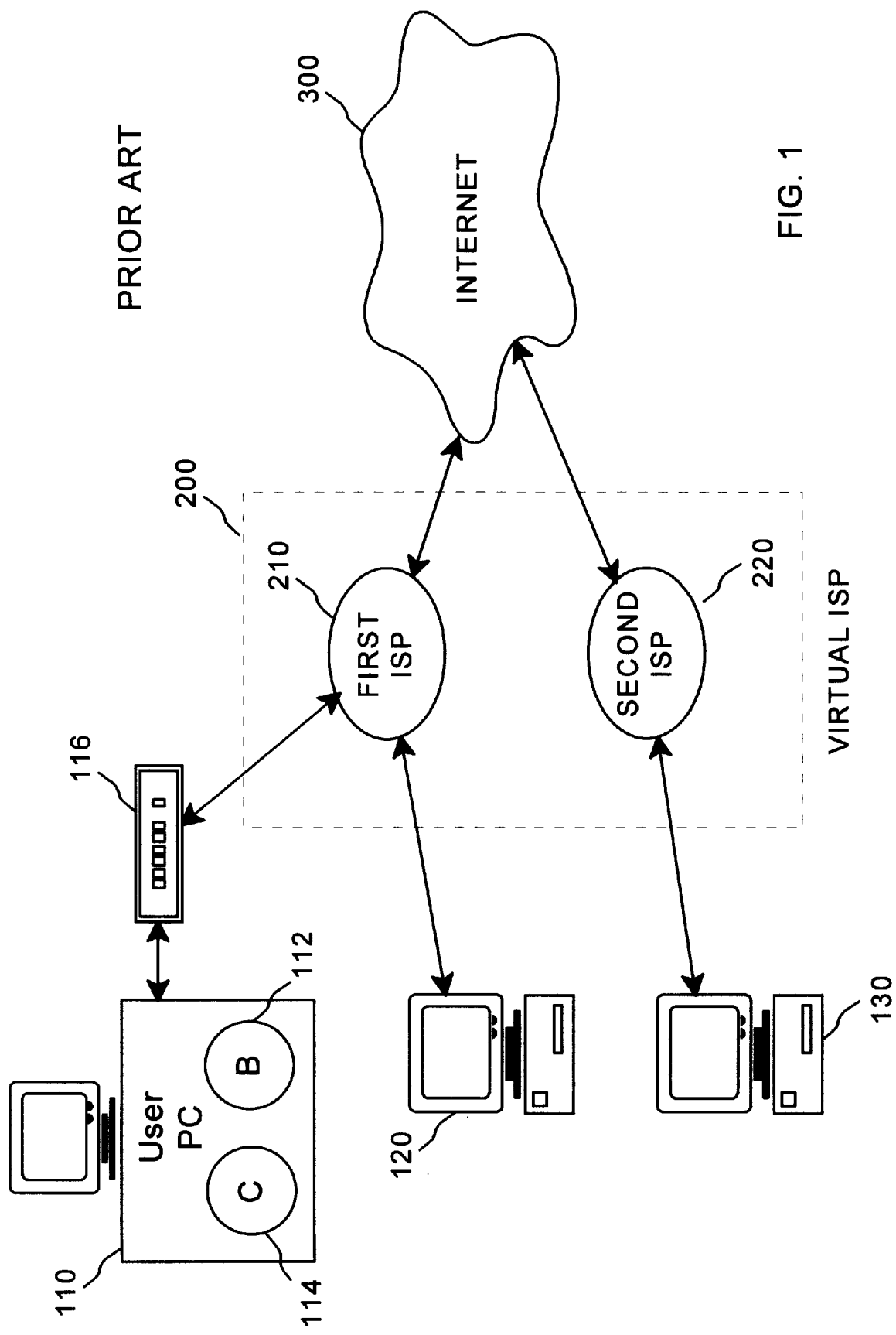
FIG. 1 is a block diagram of a known system for providing Internet access through a virtual ISP.
Figure 2:
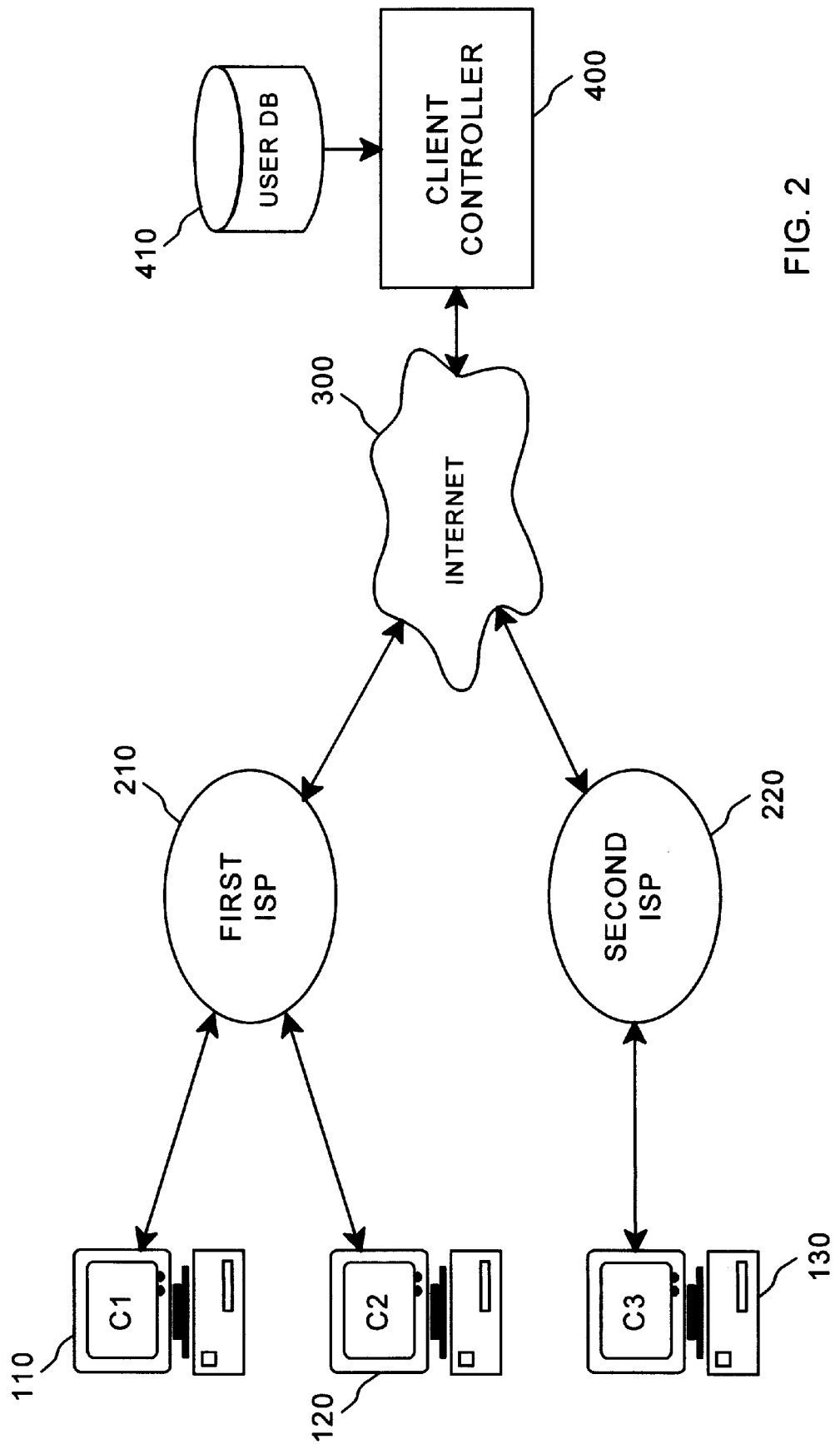
FIG. 2 is a block diagram of a system that can be used to control a client according to an embodiment of the present invention.

The present invention is directed to a method and apparatus to control a client in a communications network. Referring now in detail to the drawings wherein like parts are designated by like reference numerals throughout, there is illustrated in FIG. 2 a block diagram of a system that can be used to control a client according to an embodiment of the present invention. Similar to those described in detail with respect to FIG. 1, a number of clients 110, 120, 130 access the Internet through physically different ISPs 210, 220 in a virtual ISP network.

According to an embodiment of the present invention, the virtual ISP can use an independent client controller 400 connected to the Internet 300 to provide real time information about, and to control, the clients 110, 120, 130. The client controller 400 is "independent" in the sense that it is physically separate from the ISPs 210, 220 that provide the clients 110, 120, 130 with access to the network over which the client controller 400 and clients 110, 120, 130 communicate, in this case the Internet 300. The client controller 400 includes a communications port for communicating using the Internet and a processor configured to execute commands as described in detail below. In particular, the client controller 400 can be, for example, a group of server computers, or "server plant," capable of communicating with the clients 110, 120, 130 over the Internet 300. The server plant consists primarily of a series of servers dedicated to providing the services described (e.g., authentication, control, etc.) to the clients. Specifically, these servers can be, for example, Sun Microsystems Sparc SS-20s and Sparc Ultra 2300s, running the Solaris operating system.

The client program installed on a user's PC, such as the client 110, displays, if desired, the name and logo of the virtual ISP. To initiate a communications session, the user first logs onto the client application 110 by providing a user ID and password. The client 110 then directly dials the ISP 210 and provides the ISP with this user ID and password. The ISP 210 compares the user ID and password with authorization information that has been supplied by the virtual ISP, such as a list of authorized users. Alternatively, the ISP 210 contacts the virtual ISP 200 to authorize the user using a protocol such as the RADIUS authentication protocol. After logging on with this first tier of direct authentication, the client 110 is configured to automatically send a message to the client controller 400 over the Internet 300.

The client 110 and client controller 400 communicate using a Client Control Protocol (CCP), which is a suite of special messages sent over the Internet 300 using Transmission Control Protocol (TCP) packets having an appropriate IP address and TCP port number. Every TCP connection between a client and a server is defined by two pairs of information: the IP address and TCP port of the client and the IP address and TCP port of the server. The concept of multiple "ports" lets several applications share the same IP address. For example, the client 110 and client controller 400 will each be assigned a unique IP address in the communications network, or Internet 300. The browser 112 will use one TCP port number, such as 80, to send and receive information, such as HTML information, over the Internet 300. The client program 114 will use a different TCP port number, such as 8505, to send and receive CCP messages.

In other words, CCP is an in-band signaling protocol that operates in parallel with applications such as the browser 112 over the Internet 300. The CCP messages can be encrypted using known encryption techniques, if desired. As will be explained in detail with respect to FIGS. 3A to 3C and 4A to 4C, the client controller 400 uses the CCP to obtain information about the client 110, such as a start time and an end time of the client's access to the communications network 300. Moreover, the client controller 400 can control the client 110 using the CCP, such as by authorizing access or commanding the client 110 to perform certain tasks.

Using CCP, the client 110 transmits to the client controller 400 a start session message, including user identity information such as the user ID and the IP address of the client 110. This is used to allow the client controller 400 to perform a second tier of authentication and lets the controller 400 know that the client 110 is currently logged on. For example, the client controller 400 can match the user ID in the start session message with information in a user database 410. In addition to the user ID, the user database 410 can contain the user name, billing history and profile information. If the user ID is not authenticated, the client controller 400 can command the client 110 to terminate the session with an appropriate CCP message.

If the user ID is authorized, the client controller 400 records the user ID and the time of day in a usage log. The usage log can be, for example, a database maintained by the client controller 400. When the client logs off of the ISP 210, the client 110 uses CCP to inform the client controller 400 that the session has ended. This information can also be recorded in the usage log. In this way, the client controller 400 can determine which users are currently logged onto the system. This information can, for example, let a virtual ISP send a message to a user saying that certain other users are also currently logged on, allowing users to met in real-time chat rooms.

Figure 3A:
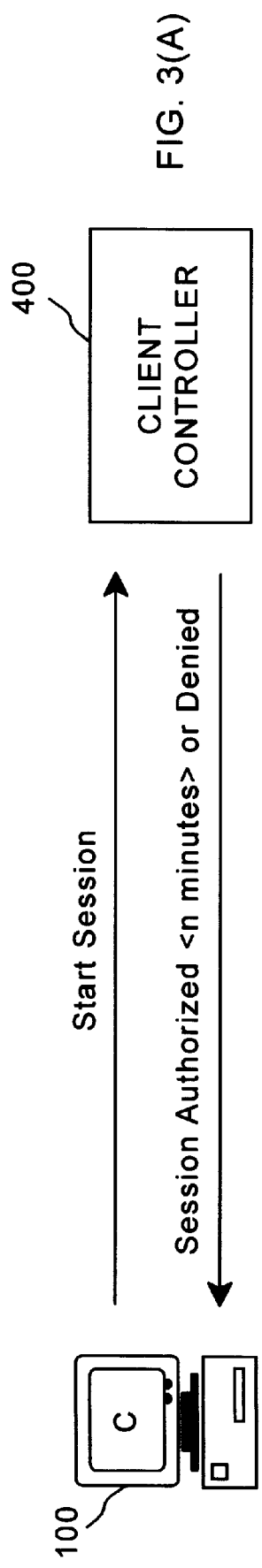
FIGS. 3A to 3C are block diagrams of various client-initiated message exchanges according to embodiments of the present invention.

Some uses for CCP will now be described with respect to FIGS. 3A to 3C, which are block diagrams of various client-initiated message exchanges using CCP according to embodiments of the present invention. FIG. 3A shows the CCP start session message being sent from a client 100 to the client controller 400. If the client controller 400 determines that the client 100 is not authorized, the session can be denied with an appropriate CCP response. Denial of authorization could occur, for example, because the user has not paid the required fee. In such a case, the client software program 100 will automatically halt access to the Internet.

If the client is authorized, the client controller 400 can send a CCP session authorization message to the client 100 authorizing access to the Internet for a predetermined period of time, such as "n" minutes. For example, the client controller 400 may inform the client 100 that access to the Internet has been authorized for the next 30 minutes. In this case, the client controller 400 records the user ID and time of day in the usage log.

Figure 3B:
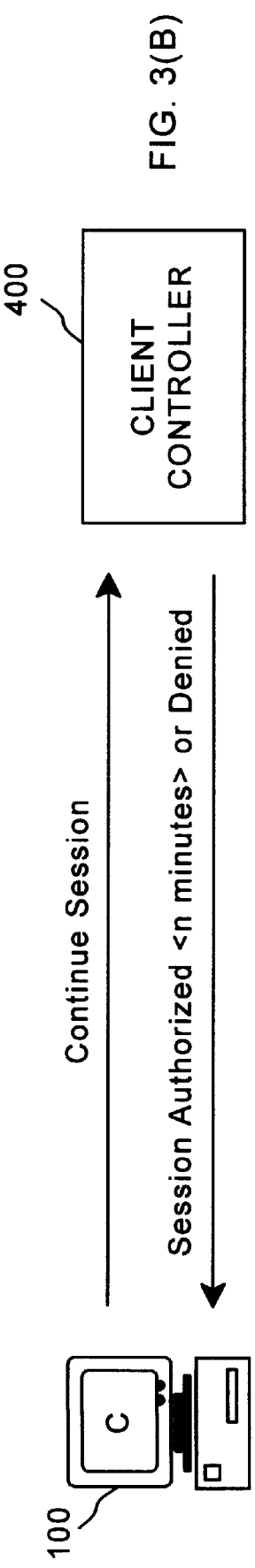

If the client 100 is still accessing the Internet, a CCP continue session request is automatically sent to the client controller 400, as shown in FIG. 3B, before the predetermined period of time expires. For example, the client 100 can be configured to automatically send a continue session request 25 minutes after being authorized to access the Internet for 30 minutes. At this time, if the client controller 400 determines that the client 100 is no longer authorized, the session continuation can be denied. This could be, for example, because the user has reached a monthly maximum allotment of time. Otherwise, the client controller 400 can send a CCP continuation authorization message telling the client 100 that access to the Internet has been authorized, by way of example, for another 30 minutes.

Figure 3C:
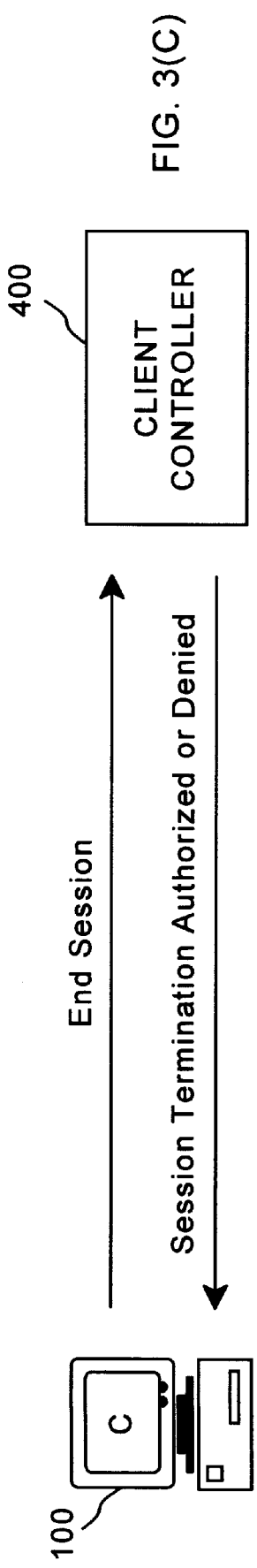

When the user logs off of the ISP, the client 100 sends a CCP end session message to the client controller 400 as shown in FIG. 3C. In this case, the client controller 400 records the user ID and time of day in the usage log. If the predetermined period of time expires and the client 100 has not sent either a continue session request or an end session message, the client controller 400 assumes that the session has been terminated and records the user ID and time of day in the usage log. By authorizing access for limited periods of time, the client controller 400 can infer that a session was terminated, for example, because the user's computer malfunctioned or its communication link, such as a telephone connection, was broken prematurely.

In this way, use of CCP enables monitoring by the client controller 400 of which users are currently accessing the Internet. Based on the current usage log, the client controller 400 can determine in real-time all users that are logged onto the system at that moment and provide a real-time list of such users. Moreover, the virtual ISP can compare the end of day usage log with billing records from each ISP to determine if users are accessing the Internet without using the client software. For example, if a user appears on an ISP billing record, but not on the virtual ISP's usage log, the user must be accessing the ISP without using the client software because no start session message was received by the client controller 400. The end of day usage log can also be used to audit and detect errors in an ISP's billing record, thus saving the virtual ISP money.

In addition to client-initiated exchanges, FIGS. 4A to 4C illustrate various server-initiated CCP message exchanges according to embodiments of the present invention. As shown in FIG. 4A, the client controller 400 can send a display command to the client 100. The command can instruct the client to display, for example, a window containing a short message. In this way, when a user is denied access for any reason the client controller 400 can send an explanation to the user. Another example is a message to inform the user that they have newly arrived e-mail.

The client controller 400 can also send a download command to the client 100, as shown in FIG. 4B. This lets the client controller 400 automatically provide information to a user, such as a new software program, patch or a list of ISP phone numbers. Finally, as shown in FIG. 4C, the client controller 400 can send a terminate session command to the client 100. With any of these server-initiated commands, the client 100 can be configured to confirm, by sending a response to the client controller 400, that the CCP command from the client controller 400 has been received or successfully completed.

Figure 5:
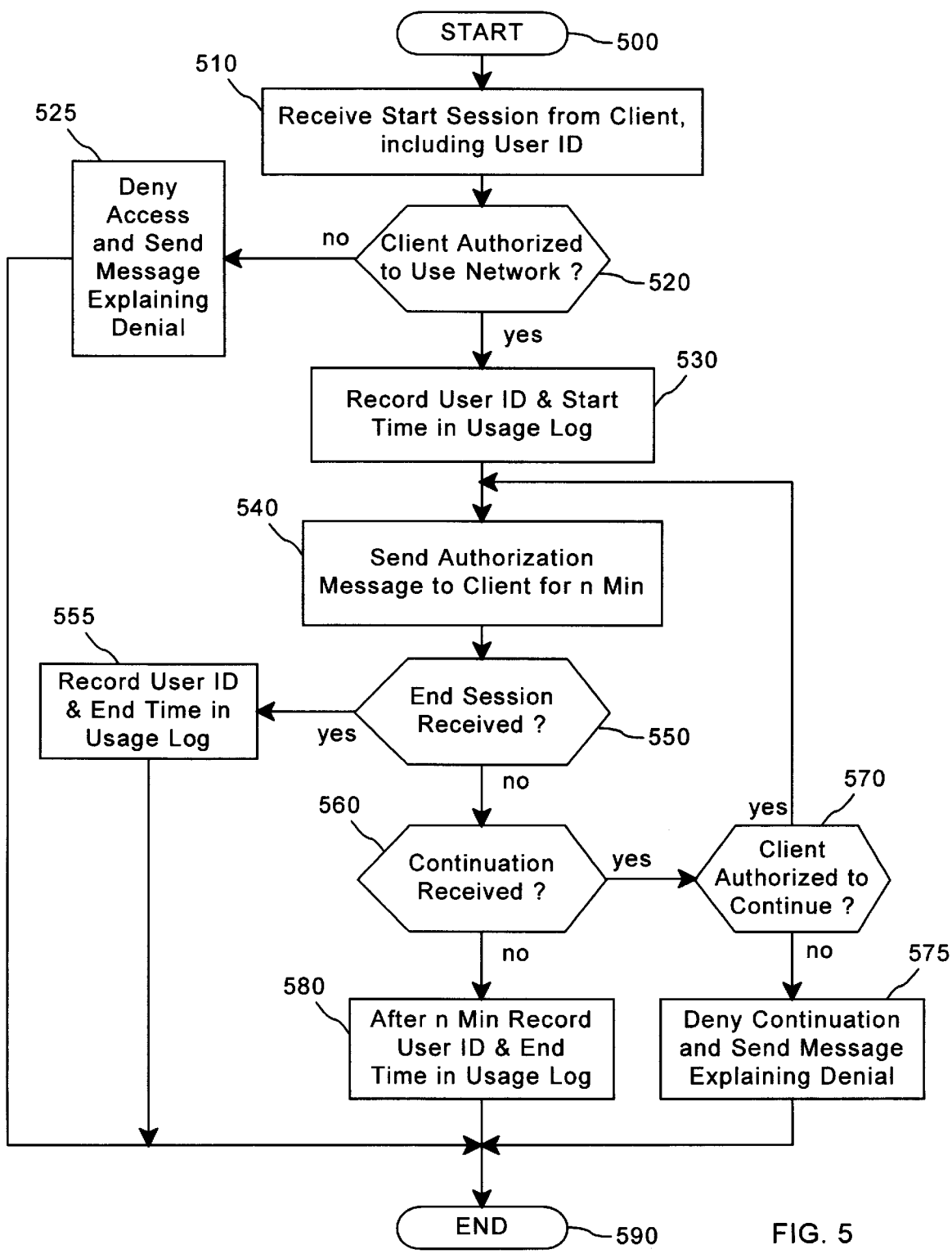
FIG. 5 is a block flow diagram of a process for controlling a client according to an embodiment of the present invention.

FIG. 5 is a block flow diagram of a process that provides control of a client according to an embodiment of the present invention. After beginning at step 500, the client controller, such as the one shown in FIG. 2, receives a start session message from a client, including the client's user ID, at step 510. If the client controller determines that the client is not authorized to use the network at step 520, access is denied and a message is sent to the client explaining the denial at step 525.

If the client controller determines that the client is authorized at step 520, the user ID and time of day are recorded in the usage log at step 530. An authorization message is then sent to the client to authorize the session for n minutes at step 540. If an end session message is received from the client at step 550, the user ID and time of day are recorded in the usage log at step 555 before the process ends at step 590. Similarly, if a continuation message is not received before the end of n minutes, the user ID and time of day are recorded in the usage log at steps 560 and 580.

If a continuation message is received at step 560, the client controller determines if continued access is authorized at step 570. If continued access is authorized, another authorization is sent and the process repeats beginning at step 540. If continued access is not authorized, access is denied and a message is sent to the client explaining the denial at step 575. If desired, the denial can also be recorded into the usage log, although this step is not shown in FIG. 5.

As is known in the art, the methods described above can be performed by hardware, software, or some combination of software and hardware. When performed by software, the methods may be executed by a processor, such as a general purpose computer, based on instructions stored on a computer-readable medium. Examples of a medium that store instructions adapted to be executed by a processor include a hard disk, a floppy disk, a Compact Disk Read Only Memory (CD-ROM), flash memory, and any other device that can store digital information. If desired, the instructions can be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

Although various embodiments are specifically illustrated and described herein, it will be appreciated that modifications and variations of the present invention are covered by the above teachings and within the purview of the appended claims without departing from the spirit and intended scope of the invention. For example, although particular CCP message exchanges have been used to illustrate the present invention, it can be appreciated that other messages and commands will also fall within the scope of the invention.

What is claimed is:

1. A method using a client controller to control a client's access to use a communications network, the client accessing the client controller through a service provider independent of the client controller, comprising the steps of:

receiving from the client a start session message containing user identity information, the start session message being received by the client controller using the communications network in accordance with a client control protocol, the start session message being sent automatically upon the client being logged on to the service provider independent of the client controller; and sending to the client a control message to control the client's access to use the communications network, the control message being sent from the client controller using the communications network in accordance with the client control protocol and in response to the start session message.

2. The method of claim 1, wherein said step of sending controls whether the client is authorized or denied access to use the communications network.

3. The method of claim 2, wherein the control message is a session authorization message authorizing the client to use the communications network for a predetermined period of time.

4. The method of claim 3, further comprising the step of:

determining if the client is authorized to use the communications network based on the user identity information, and wherein said step of sending a session authorization message is only performed if the client is authorized to use the communications network.

5. The method of claim 3, further comprising the steps of:

receiving from the client a session continuation message containing the user identity information; and sending to the client a continuation authorization message, based on the user identity information, authorizing the client to use the communications network for an additional predetermined period of time.

6. The method of claim 5, wherein the continuation authorization message is an additional session authorization message.

7. The method of claim 5, further comprising the step of determining if the client is authorized to continue to use the communications network based on the user identity information, and wherein said step of sending a continuation authorization message is only performed if the client is authorized to continue using the communications network.

8. The method of claim 2, further comprising the step of:

determining if the client is authorized to use the communications network based on the user identity information, and wherein the control message is a deny session message if the client is not authorized to use the communications network.

9. The method of claim 1, further comprising the step of sending to the client an additional control message that instructs the client to display a message to a user.

10. The method of claim 1, further comprising the step of sending to the client an additional control message that instructs the client to receive data.

11. The method of claim 1, further comprising the steps of:

recording information about a client session in a communications network usage log.

12. The method of claim 11, wherein the recorded information includes information associated with the user identity information and information associated with the time that the client session started.

13. The method of claim 11, further comprising the steps of:
receiving from the client an end session message containing the user identity information; and
recording information about the end of the client session in the usage log.

14. The method of claim 11, further comprising the step of:
recording information about an end of the client session in the usage log if no session continuation message has been received from the client during the predetermined period of time.

15. The method of claim 11, further comprising the steps of:
receiving from the service provider a communications network usage report; and
comparing the communications network usage report with the communications network usage log to determine discrepancies.

16. The method of claim 1, further comprising the steps of:
sending to the client a session termination message instructing the client to end the client session; and
recording information about the end of the client session in a usage log.

17. The method of claim 1, wherein the communications network is a packet network.

18. The method of claim 17, wherein the packet network is the Internet and the client control protocol is an in-band protocol transmitted using transmission control protocol/Internet protocol.

19. The method of claim 1, wherein said step of determining is also based on information stored in a user database.

20. A method using a client controller to monitor a client's access to use a communications network, the client accessing the client controller through a service provider independent of the client controller, comprising the steps of:
receiving from the client a start session message containing user identity information, the start session message being received by the client controller using the communication network in accordance with a client control protocol, the start session message being sent automatically upon the client being logged on to the service provider independent of the client controller;
recording in a communications network usage log information associated with the user identity information and information associated with the time that the start session message was received; and
sending to the client, in response to the start session message, a control message to control the client's access to use the communications network.

21. The method of claim 20, wherein the communications network is the Internet and the client control protocol is an in-band protocol transmitted using transmission control protocol/Internet protocol.

22. A client controller to control a client's access to use a communications network the client accessing the client controller through a service provider independent of the client controller, the client controller comprising:
a communications port capable of receiving from the client a start session message containing user identity information, the start session message being received by the client controller using the communications network in accordance with a client control protocol, the start session message being sent automatically upon the client being logged on to the service provider independent of the client controller;
a user database containing information associated with the user identity information; and
a client control processor coupled to said communications port and said user database, said client control processor being configured to send a control message to the client to control the client's access to use the communications network, the control message being sent from the client controller using the communications network in accordance with the client control protocol and in response to the start session message.

23. The client controller of claim 22, wherein the control message controls whether the client is authorized or denied access to use the communications network.

24. The client controller of claim 23, wherein the control message is a session authorization message authorizing the client to use the communications network for a predetermined period of time.

25. The client controller of claim 22, wherein the control message instructs the client to display a message to a user.

26. The client controller of claim 22, wherein the control message instructs the client to receive data.

27. The client controller of claim 22, said client control processor being further configured to record information about a client session in a communications network usage log.

28. The client controller of claim 22, wherein the communications network is the Internet and the client control protocol is an in-band protocol transmitted using transmission control protocol/Internet protocol.

29. An apparatus to control a client's access to use a communications network, the client accessing the client controller through a service provider independent of a client controller, comprising:
means for receiving from the client a start session message containing user identity information, the start session message being received by the client controller using the communications network in accordance with a client control protocol, the start session message being sent automatically upon the client being logged on to the service provider independent of the client controller;
means for determining if the client is authorized to access the communications network; and
means for sending to the client a session authorization message, the session authorization message to control the client's access to use the communications network being sent from the client controller using the communications network in accordance with the client control protocol and in response to the start session message.

30. The apparatus of claim 29, wherein the session authorization message controls whether the client is authorized or denied access to use the communications network.

31. The apparatus of claim 29, wherein the session authorization message authorizes the client to use the communications network for a predetermined period of time.

32. The apparatus of claim 29, wherein the communications network is the Internet and the client control protocol is an in-band protocol transmitted using transmission control protocol/Internet protocol.

33. An article of manufacture comprising a computer-readable medium having stored thereon instructions adapted to be executed by a processor, the intstructions which, when executed, define a series of steps to control a client's access to use a communications network, the client accessing the client controller through a service provider independent of a client controller, said steps comprising:

receiving from the client a start session message containing user identity information, the start session message being received by the client controller using the communications network in accordance with a client control protocol, the start session message being sent automatically upon the client being logged on to the service provider independent of the client controller; and sending to the client a control message to control the client's access to use the communications network, the control message being sent from the client controller using the communications network in accordance with the client control protocol and in response to the start session message.

34. The article of manufacture of claim 33, wherein said step of sending controls whether the client is authorized or denied access to use the communications network.

35. The article of manufacture of claim 33, wherein the control message is a session authorization message authorizing the client to use the communications network for a predetermined period of time.

36. The article of manufacture of claim 33, further comprising the step of sending to the client an additional control message that instructs the client to display a message to a user.

37. The article of manufacture of claim 33, further comprising the step of sending to the client an additional control message that instructs the client to receive data.

38. The article of manufacture of claim 33, further comprising the steps of:

recording information about a client session in a communications network usage log.

39. The article of manufacture of claim 33, wherein the communications network is the Internet and the client control protocol is an in-band protocol transmitted using transmission control protocol/Internet protocol.

40. A method of using a communications network having a client controller, comprising the stops of:

accessing the client controller though a service provider independent of the client controller;

sending to the client controller a start session message containing user identity information, the start session message being sent automatically upon being logged on to the service provide; and receiving from the client controller a control message to control whether the client is authorized or denied access to use the communications network, the control message being received by the client using the communications network in accordance with a client control protocol and in response to the start session message.

41. The method of claim 40, wherein the control message is a session authorization message authorizing the client to use the communications network for a predetermined period of time.

42. The article of manufacture of claim 40, further comprising the step of sending to the client an additional control message that instructs the client to display a message to a user.

43. The article of manufacture of claim 40, further comprising the step of sending to the client an additional control message that instructs the client to receive data.

44. The method of claim 40, wherein said step of accessing comprises complying with a first authentication procedure performed by the service provider and said step of sending comprises complying with a second authentication procedure performed by the client controller, the second authentication procedure being independent of the first authentication procedure.

45. The method of claim 40, further comprising the step of:

sending a session continuation message to the client controller prior to the end of the predetermined period of time.

46. The method of claim 40, further comprising the step of:

sending an end session message to the client controller.

47. The method of claim 40, wherein the communications network is the Internet and the client control protocol is an in-band protocol transmitted using transmission control protocol/Internet protocol.

48. An article of manufacture comprising a computer-readable medium having stored thereon instructions adapted to be executed by a processor, the instructions which, when executed, define a series of steps to use a communications network having a client controller, said steps comprising:

accessing the client controller through a service provider independent of the client controller;

sending to the client controller a start session message containing user identity information, the start session message being sent automatically upon being logged on to the service provider; and receiving from the client controller a control message to control whether the client is authorized or denied access to use the communications network, the control message being received by the client using the communications network in accordance with a client control protocol and in response to the start session message.

49. The article of manufacture of claim 48, wherein the control message is a session authorization message authorizing the client to use the communications network for a predetermined period of time.

50. The article of manufacture of claim 48, further comprising the step of sending to the client an additional control message that instructs the client to display a message to a user.

51. The article of manufacture of claim 48, further comprising the step of sending to the client an additional control message that instructs the client to receive data.

52. The article of manufacture of claim 48, wherein said step of accessing comprises complying with a first authentication procedure performed by the service provider and said step of sending comprises complying with a second authentication procedure performed by the client controller, the second authentication procedure being independent of the first authentication procedure.

53. The article of manufacture of claim 48, further comprising the step of:

sending a session continuation message to the client controller prior to the end of the predetermined period of time.

54. The article of manufacture of claim 48, further comprising the step of:

sending an end session message to the client controller.

55. The article of manufacture of claim 48, wherein the communications network is the Internet and the client control protocol is an in-band protocol transmitted using transmission control protocol/Internet protocol.

* * * * *

UNITED STATES PATENT AND TRADEMARK OFFICE
CERTIFICATE OF CORRECTION

PATENT NO. : 6,205,479 B1
DATED : March 20, 2001
INVENTOR(S) : Dharmender S. Dulai et al.

It is certified that error appears in the above-identified patent and that said Letters Patent is hereby corrected as shown below:

<u>Column 11,</u>
Line 41, change "stops" to -- steps --.

Signed and Sealed this

Twenty-seventh Day of November, 2001

*Attest:*

NICHOLAS P. GODICI
*Attesting Officer*     *Acting Director of the United States Patent and Trademark Office*